(12) United States Patent
Yamanaka (10) Patent No.: US 10,818,904 B2
(45) Date of Patent: Oct. 27, 2020

(54) CONNECTION MEMBER (71) Applicant: TOYOTA JIDOSHA KABUSHIKI KAISHA, Toyota-shi, Aichi-ken (JP)

(72) Inventor: Atsushi Yamanaka, Nagoya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 178 days.

(21) Appl. No.: 16/010,603

(22) Filed: Jun. 18, 2018

(65) Prior Publication Data

US 2019/0020010 A1 Jan. 17, 2019

(30) Foreign Application Priority Data

Jul. 12, 2017 (JP) .................. 2017-136198

(51) Int. Cl.
*H01M 2/20* (2006.01)
*H01R 4/44* (2006.01)
*H01R 11/09* (2006.01)
*H01R 11/01* (2006.01)

(52) U.S. Cl.
CPC ........... *H01M 2/202* (2013.01); *H01M 2/206* (2013.01); *H01R 4/44* (2013.01); *H01R 11/01* (2013.01); *H01R 11/09* (2013.01)

(58) Field of Classification Search
None
See application file for complete search history.

(56) References Cited

U.S. PATENT DOCUMENTS

| 3,204,284 A * | 9/1965 | Merriman ............. F16B 37/122 16/2.1 |
| 2011/0092111 A1 * | 4/2011 | Tsuchiya ............... H01M 2/202 439/765 |
| 2012/0129041 A1 | 5/2012 | Komazawa |

FOREIGN PATENT DOCUMENTS

JP 2012-109152 A 6/2012

* cited by examiner

*Primary Examiner* — Jonathan G Leong
*Assistant Examiner* — Kirsten B Tysl
(74) *Attorney, Agent, or Firm* — Sughrue Mion, PLLC (57) ABSTRACT

A through hole is provided in an insulating member. A bus bar is provided in the insulating member and constructed to electrically connect adjacent modules to each other when the insulating member is attached to a fixing member. A fastening bolt fastens the insulating member to the fixing member by being coupled to a nut through the through hole. A nut is provided in the through hole, and the through hole is provided to extend toward the fixing member when the insulating member is attached to the fixing member.

7 Claims, 8 Drawing Sheets

ATTACHED

FIG.6

DETACHED

FIG.7 BEFORE DETACHMENT

FIG.8 DETACHED

CONNECTION MEMBER

This nonprovisional application is based on Japanese Patent Application No. 2017-136198 filed with the Japan Patent Office on Jul. 12, 2017, the entire contents of which are hereby incorporated by reference.

BACKGROUND

Field

The present disclosure relates to a connection member and particularly to a connection member which is constructed to be attachable to and detachable from a fixing member provided between adjacent battery modules and to electrically connect the adjacent battery modules to each other.

Description of the Background Art

Japanese Patent Laying-Open No. 2012-109152 discloses a structure which connects adjacent battery modules to each other. This structure includes a nut fitted in an opening in a bus-bar plate, an insulating O ring fitted in a groove provided above a hollow portion of a bus-bar cover, and a conductive collar placed on the O ring. A cell-module bus bar is placed on the nut and an intermodule bus bar is placed on the collar.

Before the collar is fixed by a bolt, the O ring defines a space between the collar and the nut (the cell-module bus bar) so that the intermodule bus bar and the cell-module bus bar are electrically disconnected from each other. By fastening the bolt and the nut to each other by inserting the bolt in the collar, the O ring is pressed so that a lower end of the collar is brought into intimate contact with the cell-module bus bar. The intermodule bus bar and the cell-module bus bar are thus electrically connected to each other through the collar (see Japanese Patent Laying-Open No. 2012-109152).

According to the structure described in Japanese Patent Laying-Open No. 2012-109152, before the collar is fixed by the bolt, the intermodule bus bar and the cell-module bus bar can electrically be disconnected from each other. At the time of fastening and detachment of the bolt and the nut to and from each other, however, the bolt has a high voltage and hence measures for insulation such as wearing insulating gloves is required. Though connection by a connector instead of fastening of a bolt is available as another connection structure, a dedicated tool such as a lever may be required in order to ensure a contact pressure at an electrical connection portion.

SUMMARY

Therefore, an object of the present disclosure is to provide a connection member capable of electrically connecting and disconnecting adjacent battery modules to and from each other without touching a high voltage portion and without using a dedicated tool.

A connection member in the present disclosure is a connection member constructed to be attachable to and detachable from a fixing member provided between adjacent battery modules and to electrically connect the adjacent battery modules to each other. The connection member includes an insulating member, a bus bar, a first nut, and a fastening bolt. The insulating member is provided with first and second through holes. The bus bar is provided in the insulating member and constructed to electrically connect the adjacent battery modules to each other when the insulating member is attached to the fixing member. The fastening bolt fastens the insulating member to the fixing member by being coupled to the first nut through the first through hole. A thread portion is formed on an inner circumferential surface of the second through hole, and a bolt is screwed to the thread portion. The second through hole is provided to extend toward the fixing member when the insulating member is attached to the fixing member.

In the connection member, the insulating member is attached to the fixing member by the fastening bolt and the first nut. The bus bar provided in the insulating member thus electrically connects adjacent battery modules to each other. The second through hole is provided to extend toward the fixing member. When the bolt is screwed into the second through hole, a tip end portion of the bolt abuts on the fixing member. When the bolt is further screwed in, reactive force against pressing force (axial force) produced between the tip end portion of the bolt and the fixing member is applied to the insulating member from the bolt. The insulating member is thus detached from the fixing member and adjacent battery modules are electrically disconnected from each other. Thus, according to the connection member, adjacent battery modules can electrically be connected to and disconnected from each other without touching a high voltage portion and without using a dedicated tool.

The connection member may further include a collar provided in the first through hole.

Deformation of a portion around the first through hole due to fastening force at the time of fastening between the fastening bolt and the first nut can thus be suppressed and the insulating member can firmly be attached to the fixing member.

The connection member may further include a second nut provided in the second through hole.

A thread portion can thus readily be provided on an inner circumferential surface of the second through hole.

The connection member may further include a member provided between a tip end portion of the bolt and the fixing member when the bolt is screwed to the thread portion.

Large axial force accompanying axial rotation of the bolt is applied to a portion of contact with the tip end portion of the bolt. By providing a member as above, wear of the fixing member as a result of contact of the tip end portion of the bolt with the fixing member can be prevented.

The thread portion provided on the inner circumferential surface of the second through hole may be formed such that the fastening bolt detached from the first nut can be screwed to the thread portion.

Thus, the insulating member can be detached from the fixing member by fastening the fastening bolt detached from the first nut to the thread portion of the second through hole without separately preparing a bolt to be screwed to the thread portion.

The insulating member may include a first side surface and a second side surface opposed to the first side surface, and the insulating member may further be provided with a third through hole. The second through hole may be provided on a side of the first side surface relative to the first through hole, the third through hole may be provided on a side of the second side surface relative to the first through hole, a thread portion may be formed on an inner circumferential surface of the third through hole and a bolt is screwed to the thread portion, and the third through hole may be provided to extend toward the fixing member when the insulating member is attached to the fixing member.

By thus screwing the bolt also into the third through hole, the entire insulating member can reliably be detached from the fixing member.

The insulating member may be provided with a fourth through hole in a portion opposed to an opening provided in the fixing member while the insulating member is attached to the fixing member.

According to such a construction, the insulating member can be prevented from rotating together with fastening of the bolt by inserting a shaft member through the fourth through hole into the opening provided in the fixing member when the bolt is screwed into the second through hole.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

An embodiment of the present disclosure will be described below in detail with reference to the drawings. Though a plurality of embodiments will be described below, combination as appropriate of features described in each embodiment is originally intended. The same or corresponding elements in the drawings have the same reference characters allotted and description thereof will not be repeated.

First Embodiment

Figure 1:
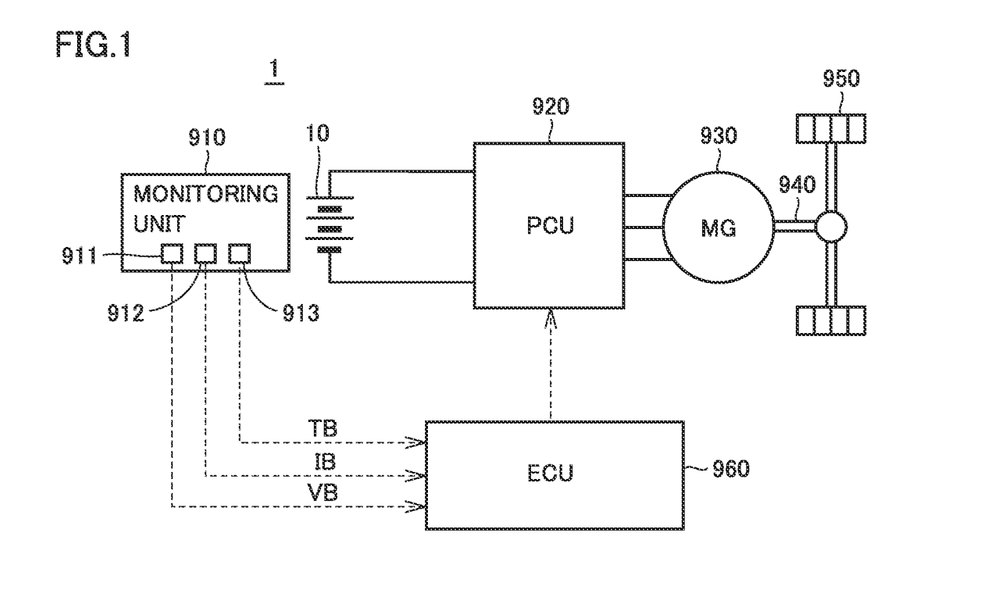
FIG. 1 is a diagram showing an overall construction of an electrically powered vehicle incorporating a battery pack including a connection member according to a first embodiment of the present disclosure.

FIG. 1 is a diagram showing an overall construction of an electrically powered vehicle 1 incorporating a battery pack including a connection member according to a first embodiment of the present disclosure. Though an example in which electrically powered vehicle 1 is implemented by an electric vehicle (EV) is representatively described below, a battery pack including the connection member according to the present disclosure is not limited to those incorporated in an EV but is applicable also to general vehicles incorporating the battery pack, such as a hybrid vehicle (HV) or a plug-in HV, and further to applications other than vehicles.

Referring to FIG. 1, electrically powered vehicle 1 includes a battery pack 10, a monitoring unit 910, a power control unit (which is referred to as a "PCU" below) 920, a motor generator (which is referred to as an "MG" below) 930, a driveshaft 940, a drive wheel 950, and an electronic control unit (which is referred to as an "ECU" below) 960.

Battery pack 10 includes a large number of cells (secondary batteries). Specifically, battery pack 10 is made up by making up a module by combining a plurality of cells and electrically connecting a plurality of modules to one another through connection members in the present disclosure. Battery pack 10 stores electric power for driving MG 930 and can supply electric power to MG 930 through PCU 920. Battery pack 10 is charged by receiving generated electric power through PCU 920 while MG 930 generates electric power.

Monitoring unit 910 includes a voltage sensor 911, a current sensor 912, and a temperature sensor 913. Voltage sensor 911 detects a voltage VB of battery pack 10 and current sensor 912 detects a charging and discharging current IB of battery pack 10. Temperature sensor 913 detects a temperature TB of battery pack 10.

PCU 920 bidirectionally converts electric power between battery pack 10 and MG 930 in response to a control signal from ECU 960. PCU 920 includes, for example, an inverter which drives MG 930 and a converter which boosts a direct-current (DC) voltage supplied to the inverter to a voltage equal to or higher than an output voltage from battery pack 10.

MG 930 is implemented representatively by an alternating-current (AC) rotating electric machine, and it is, for example, a three-phase AC synchronous motor having a permanent magnet embedded in a rotor. MG 930 generates rotational driving force as being driven by PCU 920 and driving force generated by MG 930 is transmitted to drive wheel 950 through driveshaft 940. During braking or suppression of acceleration on a downslope by electrically powered vehicle 1, MG 930 operates as a generator and regenerates electric power. Electric power generated by MG 930 is supplied to battery pack 10 through PCU 920.

ECU 960 includes a central processing unit (CPU), a memory (a read only memory (ROM) and a random access memory (RAM)), and an input and output port for input and output of various signals (none of which are shown). ECU 960 controls drive of MG 930 and charging and discharging of battery pack 10 by controlling PCU 920 based on a signal received from each sensor and a program and a map stored in the memory.

As described above, in battery pack 10, battery pack 10 is made up by electrically connecting a plurality of modules to one another. Fastening of a bus bar extending from a module or a terminal of a wire with a bolt is available as a technique for electrically connecting adjacent modules to each other. In this case, however, the bolt has a high voltage and hence measures for insulation such as wearing insulating gloves are required. Though connection by a connector instead of fastening of a bolt is available as another connection technique, a dedicated tool such as a lever may be required in order to ensure a contact pressure at an electrical connection portion.

The present first embodiment shows a connection member which can electrically connect and disconnect adjacent modules to and from each other without touching a high voltage portion and without using a dedicated tool. The connection member according to the present first embodiment will be described below in detail.

Figure 2:
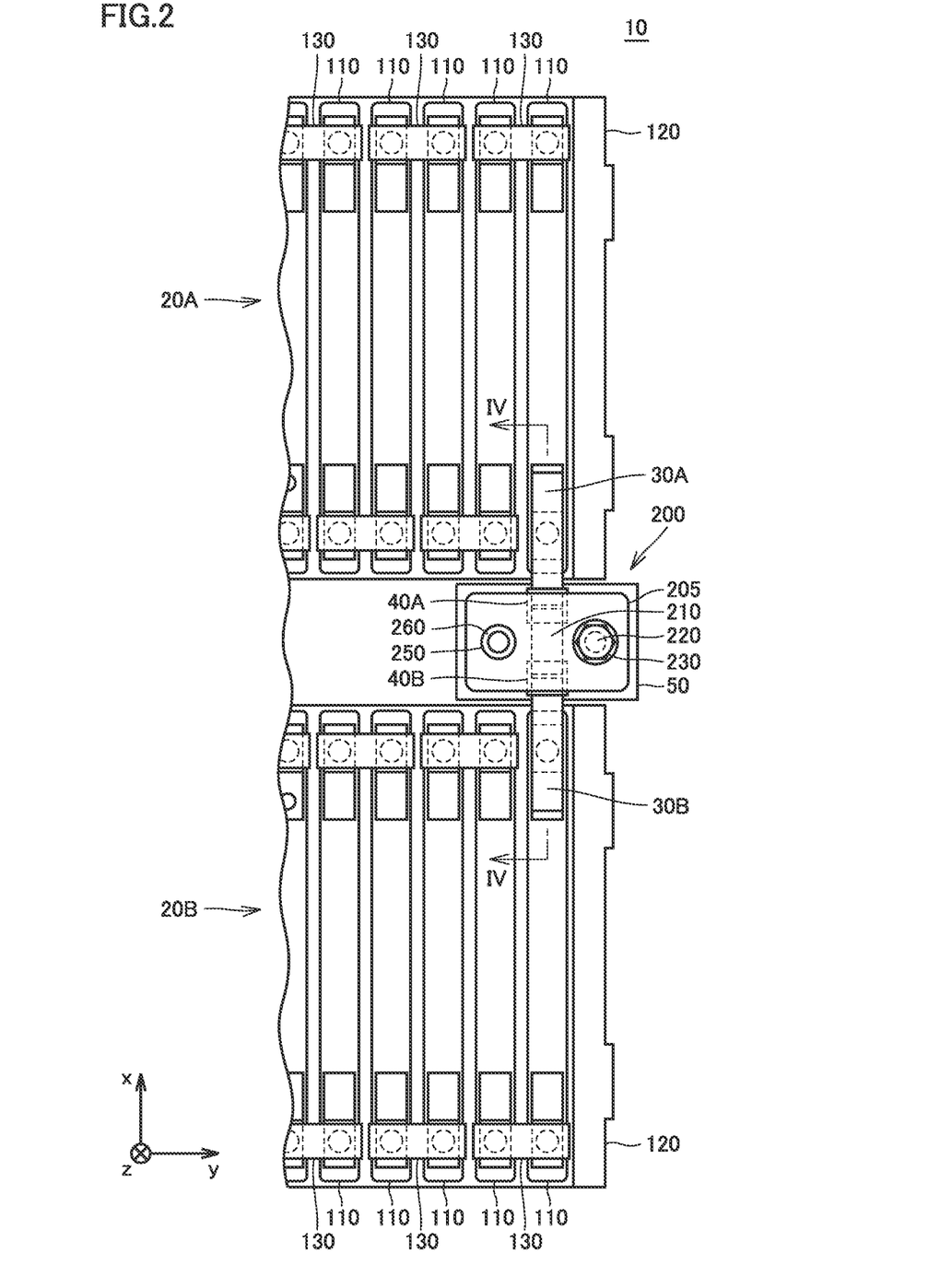
FIG. 2 is a first diagram showing a construction example of the battery pack shown in FIG. 1.
Figure 3:
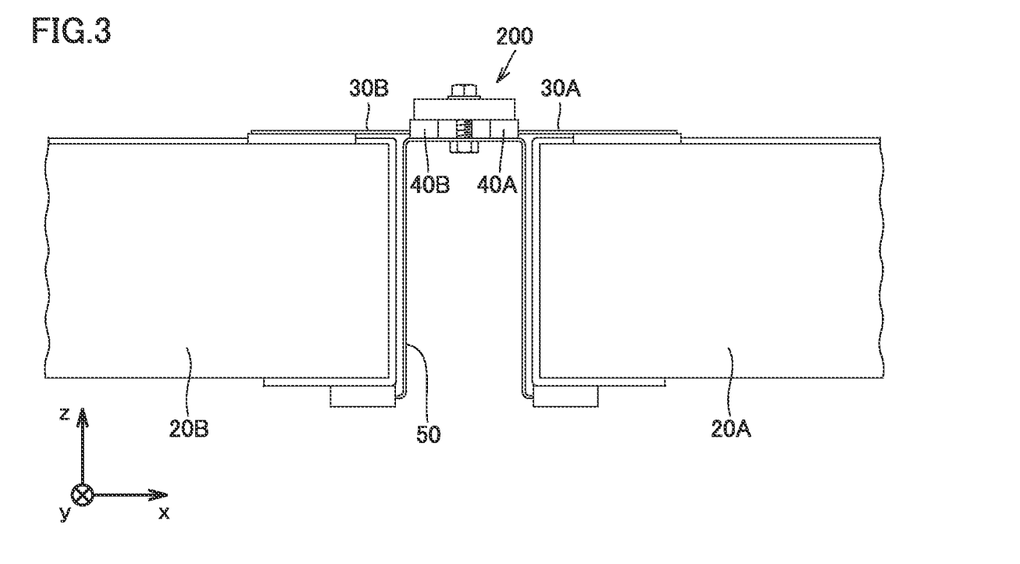
FIG. 3 is a second diagram showing the construction example of the battery pack shown in FIG. 1.

FIGS. 2 and 3 are diagrams showing a construction example of battery pack 10 shown in FIG. 1. FIG. 2 is a diagram of an electrical connection portion between two adjacent modules of a plurality of modules making up battery pack 10 and a portion around the same viewed in a direction of a z axis. FIG. 3 is a diagram of the module shown in FIG. 2 viewed from a direction of a y axis. FIG. 3 does not show an end plate 120 provided in each module.

Referring to FIGS. 2 and 3, battery pack 10 includes adjacent modules 20A and 20B. Each of modules 20A and 20B includes a plurality of cells 110, end plate 120, and a plurality of intercell bus bars 130. Battery pack 10 further includes bus bars 30A and 30B, connectors 40A and 40B, a fixing member 50, and a connection member 200.

Each of the plurality of cells 110 is, for example, substantially in a shape of a parallelepiped. In each of modules 20A and 20B, the plurality of cells 110 are stacked such that side surfaces greatest in area (surfaces in parallel to an xz plane in the figures) are opposed to each other. FIG. 2 partially shows one end in a direction of stack (a y direction) of a stack made up by stacking the plurality of cells 110. A pair of end plates 120 (only one of which is shown in FIG. 2) is arranged at one and the other ends in the direction of stack.

Intercell bus bar 130 electrically connects a positive electrode terminal of one cell and a negative electrode terminal of an adjacent cell to each other. Bus bar 30A is connected to a terminal closer to module 20B of terminals of cell 110 adjacent to illustrated end plate 120 in module 20A. Bus bar 30A is provided to extend toward module 20B and connected to connector 40A provided on fixing member 50.

Bus bar 30B is connected to a terminal closer to module 20A of terminals of cell 110 adjacent to illustrated end plate 120 in module 20B. Bus bar 30B is provided to extend toward module 20A and connected to connector 40B provided on fixing member 50.

Fixing member 50 is provided between modules 20A and 20B. By attaching connection member 200 on fixing member 50, bus bar 30A of module 20A and bus bar 30B of module 20B are electrically connected to each other through connection member 200. Though fixing member 50 is fixed to a housing of modules 20A and 20B, it may be fixed to a housing of battery pack 10.

Connectors 40A and 40B are provided on fixing member 50. As described above, bus bars 30A and 30B are connected to connectors 40A and 40B, respectively. Each of connectors 40A and 40B is, for example, an insertion type connector. When connection member 200 is attached to fixing member 50, opposing end portions of a bus bar 210 provided in connection member 200 are inserted in connectors 40A and 40B, respectively, so that bus bar 30A and bus bar 30B are electrically connected to each other through bus bar 210.

Connection member 200 is a member constructed to electrically connect adjacent modules 20A and 20B to each other. Connection member 200 is constructed to be attachable to and detachable from fixing member 50 provided between modules 20A and 20B.

Figure 4:
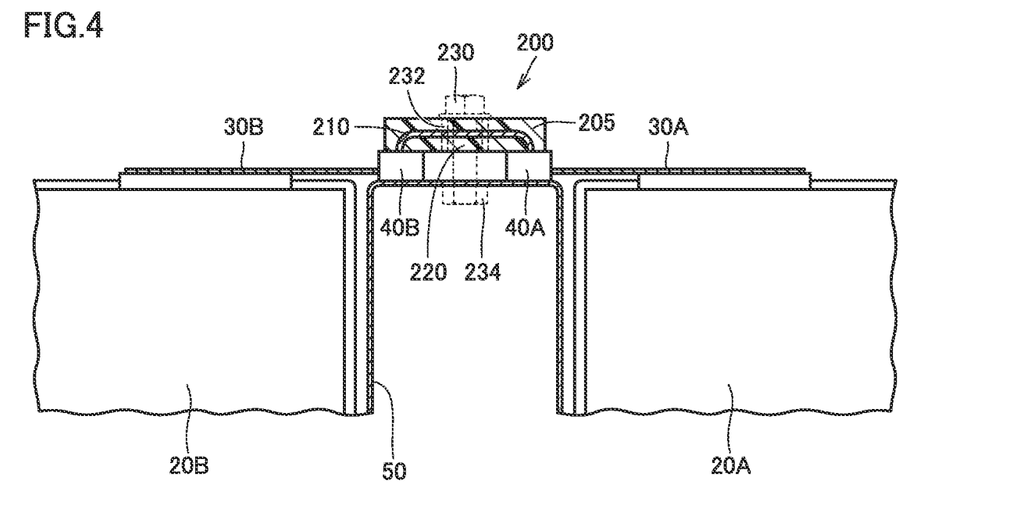
FIG. 4 is a cross-sectional view along the line IV-IV in FIG. 2.

FIG. 4 is a cross-sectional view along the line IV-IV in FIG. 2. Referring to FIG. 2 together with FIG. 4, connection member 200 includes an insulating member 205, bus bar 210, fastening bolt 230, a collar 232, a nut 234, and a nut 260.

Insulating member 205 is made, for example, of an insulating resin or ceramics. Insulating member 205 is provided with through holes 220 and 250 for insertion of a bolt. Through hole 220 is a hole for insertion of fastening bolt 230 and through hole 250 (FIG. 2) is a hole for insertion of a not-shown bolt (which will be described later) when connection member 200 (insulating member 205) is detached from fixing member 50.

Bus bar 210 is provided as being fixed in insulating member 205. In this first embodiment, bus bar 210 is embedded in insulating member 205 except for opposing end portions connected to respective connectors 40A and 40B in attachment of connection member 200 to fixing member 50. In this first embodiment, bus bar 210 is located between through hole 220 and through hole 250 when insulating member 205 is two-dimensionally viewed in the direction of the z axis (FIG. 2).

Bus bar 210 is constructed such that opposing end portions exposed through insulating member 205 thereof are inserted in respective connectors 40A and 40B when connection member 200 is attached to fixing member 50. When connection member 200 is thus attached to fixing member 50, bus bar 30A of module 20A and bus bar 30B of module 20B are electrically connected to each other through bus bar 210.

Fastening bolt 230 fastens insulating member 205 to fixing member 50 by being coupled to nut 234 through through hole 220. Specifically, a through hole for insertion of fastening bolt 230 is provided below through hole 220 also in fixing member 50. As a result of coupling between fastening bolt 230 inserted from above into through hole 220 in insulating member 205 and nut 234 provided on a lower surface side of fixing member 50 below the through hole, insulating member 205 is fastened to fixing member 50.

Collar 232 is provided in through hole 220. When insulating member 205 is composed of a resin, by providing collar 232, deformation of a portion in the vicinity of through hole 220 due to fastening force at the time of fastening between fastening bolt 230 and nut 234 is suppressed, so that insulating member 205 can firmly be attached to fixing member 50. Collar 232 is not essential and collar 232 does not have to be provided so long as desired fastening force can be ensured.

Nut 260 (FIG. 2) is provided in through hole 250 in insulating member 205 and provided as being fixed to insulating member 205. Nut 260 is used as a member for detaching insulating member 205 from fixing member 50 together with a not-shown bolt fastened to nut 260. Specifically, through hole 250 is provided to extend toward fixing member 50 (the direction of the z axis) when insulating member 205 is attached to fixing member 50. No through hole is provided in fixing member 50 below through hole 250. By screwing a bolt into nut 260 to have the bolt abut on fixing member 50, insulating member 205 can be detached from fixing member 50, which will be described in detail later.

Though nut 260 is provided in through hole 250 in this example, a thread portion 290 to be screwed to a bolt may directly be formed on an inner circumferential surface of through hole 250 without providing nut 260. By providing nut 260 as in this example, a thread portion 290 to be screwed to a bolt can readily be provided on the inner circumferential surface of through hole 250.

Figure 5:
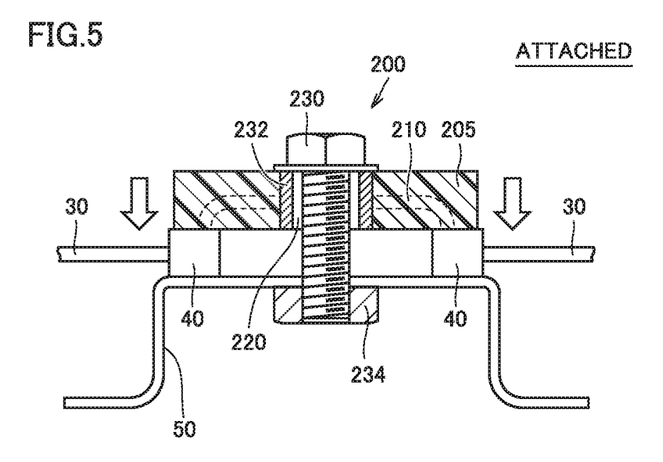
FIG. 5 is a diagram showing the connection member as being attached to a fixing member.

FIG. 5 is a diagram showing connection member 200 as being attached to fixing member 50. In view of symmetry of features, bus bars 30A and 30B (FIGS. 2 and 4) may simply also be denoted to as bus bar 30 below and connectors 40A and 40B (FIGS. 2 and 4) may also simply be denoted to as connector 40.

Referring to FIG. 5, connection member 200 is attached to fixing member 50 by fastening fastening bolt 230 to nut 234 provided below fixing member 50 through through hole 220 in insulating member 205. Opposing end portions of bus bar 210 are inserted in connector 40 by attaching insulating member 205 of connection member 200 to fixing member 50, so that bus bars 30 of adjacent modules are electrically connected to each other through bus bar 210.

In connection member 200, connection member 200 is attached to fixing member 50 by using a bolt (fastening bolt 230) and a nut (nut 234) which represent common tools. Since axial force resulting from fastening of fastening bolt 230 to nut 234 can be applied to a portion of connection between bus bar 210 and connector 40, a contact pressure at a connection portion is ensured. Since fastening bolt 230 and a high voltage portion (bus bars 210 and 30) are isolated from each other by insulating member 205, a technician does not touch the high voltage portion during working with fastening bolt 230 and nut 234.

Figure 6:
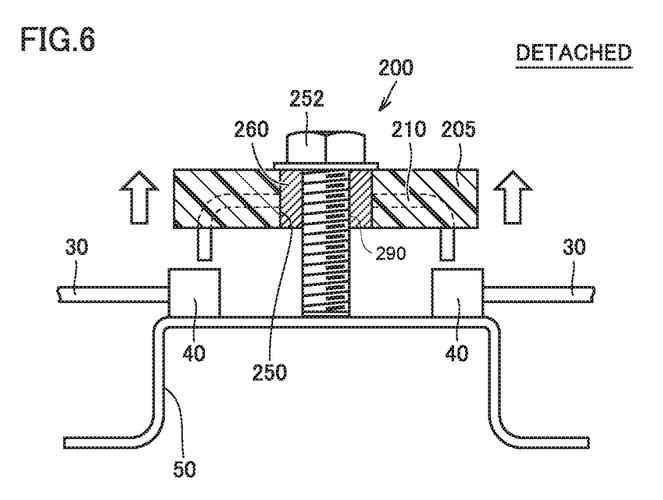
FIG. 6 is a diagram showing the connection member as being detached from the fixing member.

FIG. 6 is a diagram showing connection member 200 as being detached from fixing member 50. Referring to FIG. 6, in detaching connection member 200 from fixing member 50, with fastening bolt 230 shown in FIG. 5 being detached from nut 234, a bolt 252 is screwed into nut 260 provided in through hole 250 in insulating member 205. When a tip end portion of bolt 252 comes in contact with fixing member 50, reactive force against pressing force (axial force) produced between the tip end portion of bolt 252 and fixing member 50 is applied to insulating member 205 through nut 260 from bolt 252. Insulating member 205 is thus detached from fixing member 50 and bus bars 30 of adjacent modules are electrically disconnected from each other.

In connection member 200, connection member 200 can be detached from fixing member 50 by using a bolt (bolt 252) representing a common tool also in detachment of connection member 200 from fixing member 50. Since reactive force against axial force produced between the tip end portion of bolt 252 and fixing member 50 at the time of fastening of bolt 252 can be applied to a portion of connection between bus bar 210 and connector 40, bus bar 210 and connector 40 can be disconnected from each other without using a dedicated tool for detachment. Since bolt 252 and a high voltage portion (bus bars 210 and 30) are isolated from each other by insulating member 205, a technician does not touch the high voltage portion during working with bolt 252.

Since fastening bolt 230 has been detached by the time of detachment of connection member 200 from fixing member 50 by using bolt 252, fastening bolt 230 may be used as bolt 252. Nut 260 may be constructed to be fastened to fastening bolt 230, or a thread portion 290 to which fastening bolt 230 can be fastened may be formed on the inner circumferential surface of through hole 250 through which bolt 252 is inserted. It is thus not necessary to prepare bolt 252 separately from fastening bolt 230 and cost for parts can be reduced.

As set forth above, in this first embodiment, insulating member 205 is attached to fixing member 50 by coupling fastening bolt 230 and nut 234 to each other through through hole 220 provided in insulating member 205 of connection member 200. Thus, bus bar 210 provided in insulating member 205 electrically connects adjacent modules 20A and 20B to each other. Insulating member 205 is detached from fixing member 50 and adjacent modules 20A and 20B are electrically disconnected from each other by screwing bolt 252 into through hole 250 provided in insulating member 205. Thus, according to this first embodiment, adjacent modules 20A and 20B can electrically be connected to and disconnected from each other without touching a high voltage portion and without using a dedicated tool.

Second Embodiment

In the first embodiment, since the tip end portion of bolt 252 is pressed against fixing member 50 in detachment of connection member 200 from fixing member 50, fixing member 50 may be worn. In this second embodiment, measures for prevention of wear of fixing member 50 are taken.

Figure 7:
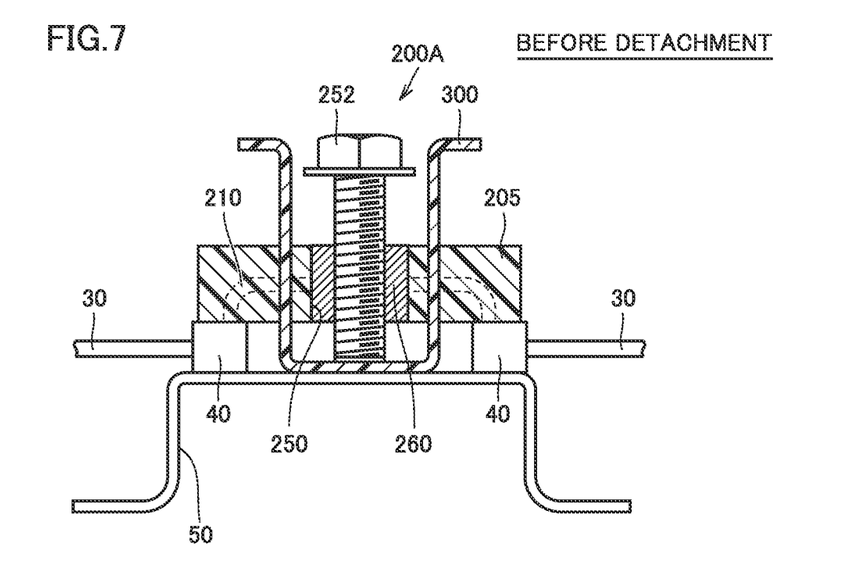
FIG. 7 is a first diagram showing a construction example of a connection member according to a second embodiment.
Figure 8:
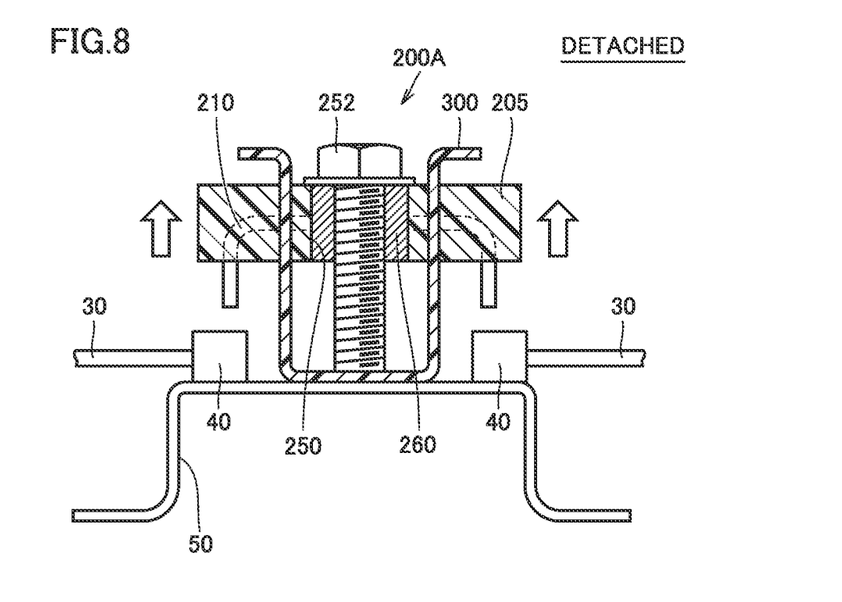
FIG. 8 is a second diagram showing the construction example of the connection member according to the second embodiment.

FIGS. 7 and 8 are diagrams showing a construction example of a connection member according to the second embodiment. FIGS. 7 and 8 correspond to FIG. 6 described in the first embodiment and show a state that bolt 252 is fastened to nut 260 provided in through hole 250 in insulating member 205. FIG. 7 shows a state before detachment of insulating member 205 from fixing member 50 and FIG. 8 shows insulating member 205 as being detached from fixing member 50.

Referring to FIG. 7, a connection member 200A according to the second embodiment further includes a wear suppression plate 300 in connection member 200 described in the first embodiment. Wear suppression plate 300 includes a bottom surface portion in contact with an upper surface of fixing member 50 below through hole 250 in insulating member 205, and side surface portions which are erected from the bottom surface portion with through hole 250 lying therebetween along an axial direction of bolt 252. Opposing side surface portions pass through insulating member 205, and insulating member 205 is movable along the axial direction of bolt 252 while it is restrained by the side surface portions.

Referring to FIG. 8, insulating member 205 moves away from fixing member 50 together with nut 260 by screwing bolt 252 while the tip end portion of bolt 252 abuts on wear suppression plate 300. Large axial force accompanying rotation of bolt 252 is applied to a portion of contact with the tip end portion of bolt 252. Since connection member 200A according to the second embodiment is provided with wear suppression plate 300 between the tip end portion of bolt 252 and fixing member 50, wear of fixing member 50 can be prevented.

Since connection member 200A including wear suppression plate 300 is provided in battery pack 10, wear suppression plate 300 is preferably made of an insulator and composed, for example, of a resin.

Modification

Figure 9:
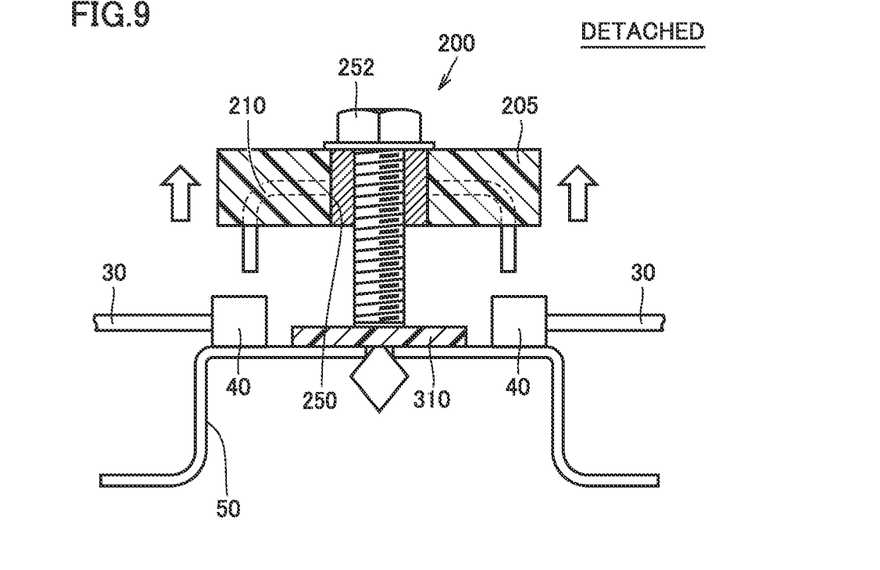
FIG. 9 is a diagram showing a construction example of a connection member according to a modification.

A feature for preventing wear of fixing member 50 in detachment of insulating member 205 from fixing member 50 is not limited to wear suppression plate 300 constructed as above. For example, as shown in FIG. 9, instead of wear suppression plate 300, a wear suppression plate 310 attached to the upper surface of fixing member 50 by a clip structure may be provided below through hole 250 provided in insulating member 205.

Wear suppression plate 310 is also made preferably of an insulator, and wear suppression plate 310 is also composed, for example, of a resin.

Other Embodiments

In each embodiment above, in attachment of connection member 200 (200A) to fixing member 50, opposing end portions of bus bar 210 provided in connection member 200 (200A) are inserted in insertion type connector 40 so that bus bar 210 and bus bar 30 extending from a module are electrically connected to each other. A structure which connects bus bar 210 and bus bar 30 to each other, however, is not limited to such a connector.

Figure 10:
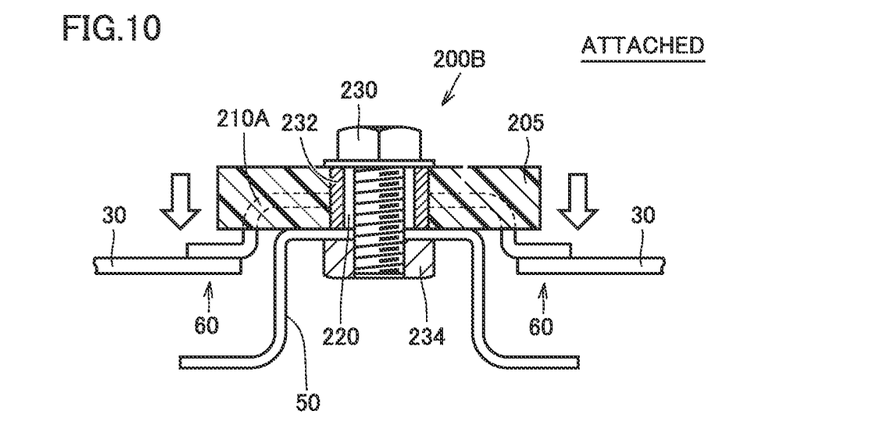
FIG. 10 is a diagram showing another construction of the connection member.

FIG. 10 is a diagram showing another construction of the connection member. FIG. 10 corresponds to FIG. 5 described in the first embodiment. Referring to FIG. 10, a connection member 200B includes a bus bar 210A instead of bus bar 210 in connection member 200 described in the first embodiment.

Bus bar 210A has opposing tip end portions bent in parallel to bus bar 30. When connection member 200B is attached to fixing member 50, bus bar 210A and bus bar 30 are electrically connected to each other by surface contact of each of the opposing end portions of bus bar 210A with bus bar 30 of each module at a contact portion 60. According to such a construction, an area of contact can be increased while a contact pressure between bus bar 210A and bus bar 30 is ensured, and a connection resistance of bus bar 210A and bus bar 30 can be lowered.

Figure 11:
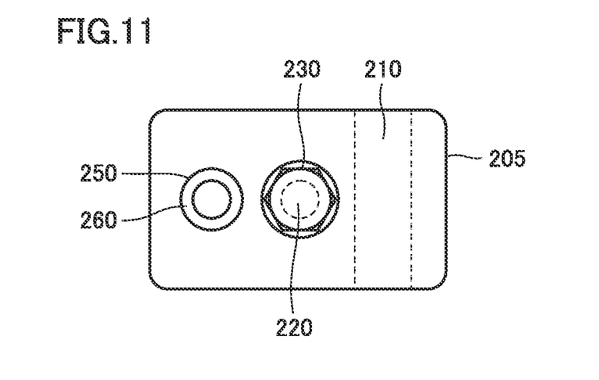
FIG. 11 is a diagram showing yet another construction of the connection member.

In each embodiment above, bus bar 210 is located between through hole 220 and through hole 250 when insulating member 205 is two-dimensionally viewed (FIG. 2). As shown in FIG. 11, however, bus bar 210 may be located, for example, on a side opposite to through hole 250 with through hole 220 being interposed.

In detachment of insulating member 205 from fixing member 50, rotational force is applied to insulating member 205 by screwing bolt 252 into through hole 250. A feature for preventing insulating member 205 from rotating due to this rotational force may be provided.

Figure 12:
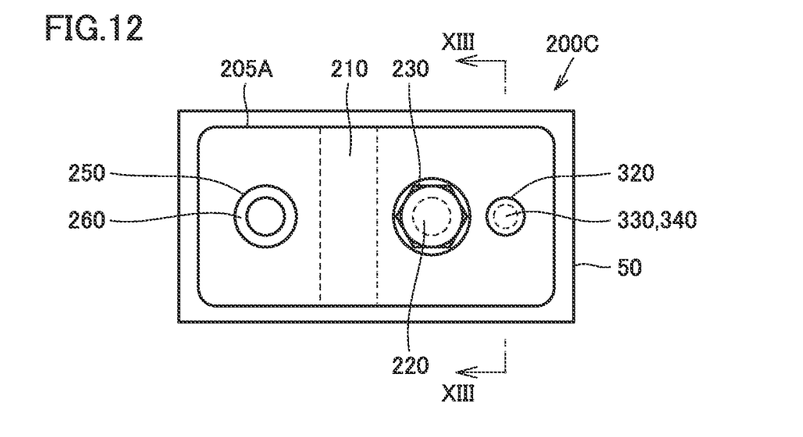
FIG. 12 is a diagram showing still another construction of the connection member.
Figure 13:
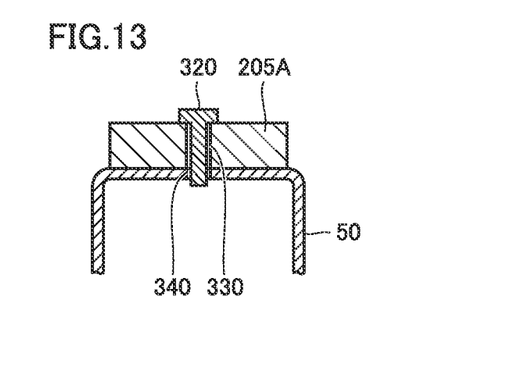
FIG. 13 is a cross-sectional view along the line XIII-XIII in FIG. 12.

FIG. 12 is a diagram showing yet another construction of the connection member. FIG. 13 is a cross-sectional view along the line XIII-XIII in FIG. 12. Referring to FIG. 13 together with FIG. 12, a connection member 200C includes an insulating member 205A instead of insulating member 205 in connection member 200 described in the first embodiment.

Insulating member 205A is further provided with a through hole 330 in addition to through holes 220 and 250. An opening 340 is also provided in fixing member 50 below through hole 330. Opening 340 may be a through hole or provided as a recess.

When insulating member 205A is detached from fixing member 50 by screwing bolt 252 into through hole 250, a shaft member 320 is inserted in opening 340 in fixing member 50 through through hole 330. As shaft member 320 is inserted, insulating member 205A can be prevented from rotating due to rotational force applied to insulating member 205A from bolt 252 in detachment of insulating member 205A from fixing member 50 by screwing bolt 252 into through hole 250.

Figure 14:
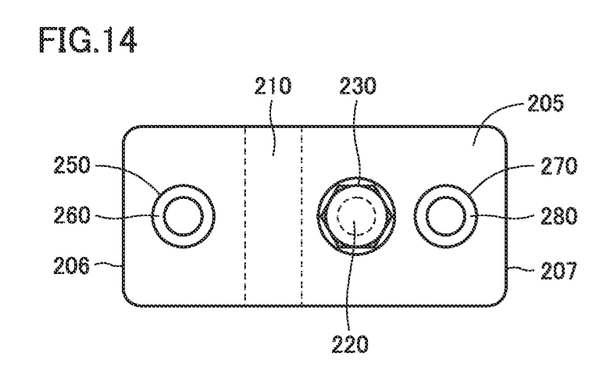
FIG. 14 is a diagram showing yet another construction of the connection member.

A plurality of through holes for screwing a bolt in detachment of insulating member 205 from fixing member 50 may be provided. For example, as shown in FIG. 14, when through hole 250 is provided on a side of a first side surface 206 of insulating member 205, another through hole 270 may further be provided on a side of a second side surface 207 opposed to first side surface 206 and a nut 280 may further be provided in through hole 270. Similarly to nut 260, nut 280 is also used as a member for detaching insulating member 205 (connection member 200) from fixing member 50, together with a not-shown bolt fastened to nut 280.

In detachment of insulating member 205 from fixing member 50, insulating member 205 may be tilted and may not successfully be detached simply by screwing bolt 252 into nut 260. By screwing a bolt also in nut 280, the entire insulating member 205 can reliably be detached from fixing member 50, In this case as well, a thread portion 290 to be screwed to a bolt may directly be formed on an inner circumferential surface of through hole 270 without providing nut 280 in through hole 270.

Though embodiments of the present disclosure have been described, it should be understood that the embodiments disclosed herein are illustrative and non-restrictive in every respect. The scope of the present invention is defined by the terms of the claims and is intended to include any modifications within the scope and meaning equivalent to the terms of the claims.

What is claimed is:

1. A connection member constructed to be attachable to and detachable from a fixing member provided between adjacent battery modules and to electrically connect the adjacent battery modules to each other, the connection member comprising:
   an insulating member provided with first and second through holes;
   a bits bar provided in the insulating member and constructed to electrically connect, the adjacent battery modules to each other when the insulating member is attached to the fixing member;
   a first nut; and
   a fastening bolt which fastens the insulating member to the fixing member by being coupled, to the first nut through the first through hole, wherein
   the fastening bolt and the first nut are isolated from the bus bar by the insulating member;
   a thread portion is formed on an inner circumferential surface within the second through hole, the bolt being screwed to the thread portion when the insulating member is detached from the fixing member; and
   the second through hole extends toward the fixing member when the insulating member is attached to the fixing member.

2. The connection member according to claim 1, the connection member further comprising a collar provided in the first through hole.

3. The connection member according to claim 1, the connection member further comprising a second nut provided in the second through hole.

4. The connection member according to claim 1, the connection member further comprising a member provided between a tip end portion of the bolt and the fixing member when the bolt is screwed to the thread portion.

5. The connection member according to claim 1, wherein the thread portion is formed such that the fastening bolt detached from the first nut can be screwed to the thread portion.

6. The connection member according to claim 1, wherein the insulating member includes a first side surface and a second side surface opposed to the first side surface,
   the insulating member is further provided with a third through hole, the second through hole is provided on a side of the first side surface relative to the first through hole, the third through hole is provided on a side of the second side surface relative to the first through hole, a thread portion is formed on an inner circumferential surface of the third through hole and a bolt is screwed to the thread portion, and the third through hole is provided to extend toward the fixing member when the insulating member is attached to the fixing member.

7. The connection member according to claim 1, wherein the insulating member is provided with a third through hole in a portion opposed to an opening provided in the fixing member while the insulating member is attached to the fixing member.

* * * * *